(12) United States Patent
Huang et al.

(10) Patent No.: US 9,094,854 B2
(45) Date of Patent: Jul. 28, 2015

(54) REDUCING POWER CONSUMPTION FOR M2M COMMUNICATIONS IN WIRELESS NETWORKS

(75) Inventors: Rui Huang, Beijing (CN); Honggang Li, Beijing (CN); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 13/991,646

(22) PCT Filed: Dec. 21, 2011

(86) PCT No.: PCT/US2011/066640
§ 371 (c)(1),
(2), (4) Date: Jun. 5, 2013

(87) PCT Pub. No.: WO2012/121782
PCT Pub. Date: Sep. 13, 2012

(65) Prior Publication Data
US 2013/0336223 A1    Dec. 19, 2013

Related U.S. Application Data

(60) Provisional application No. 61/450,716, filed on Mar. 9, 2011.

(51) Int. Cl.
*H04W 80/08* (2009.01)
*H04W 88/06* (2009.01)
(Continued)

(52) U.S. Cl.
CPC .......... *H04W 28/0215* (2013.01); *H04W 4/005* (2013.01); *H04W 48/16* (2013.01);
(Continued)

(58) Field of Classification Search
CPC ..... H04W 80/08; H04W 88/06; H04W 28/04; H04W 72/04; H04Q 11/0478; H04L 2012/563; H04L 47/10; H04L 45/00; H04L 29/0653
USPC .............................................. 370/328, 395.2
See application file for complete search history.

(56) References Cited

U.S. PATENT DOCUMENTS

2004/0203943 A1* 10/2004 Cai et al. ........................ 455/466
2008/0159292 A1*  7/2008 Jiang et al. ..................... 370/392
2009/0036109 A1*  2/2009 Shintani ......................... 455/418

FOREIGN PATENT DOCUMENTS

WO    WO-2012121782 A2    9/2012
WO    WO-2012121782 A3    9/2012

OTHER PUBLICATIONS

"Air Interface for Broadband Wireless Access Systems—Enhancements to Support Machine-to-Machine Applications", IEEE P802.16p/D1, (Oct. 2001), 43 pgs.

(Continued)

*Primary Examiner* — Ronald B Abelson
(74) *Attorney, Agent, or Firm* — Schwegman Lundberg & Woessner, P.A.

(57) ABSTRACT

Systems and methods for establishing power saving data transmissions with machine-to-machine (M2M) communication capable devices and like user equipment in wireless networks are generally disclosed herein. One embodiment includes data transmission techniques to bundle small M2M data packet transmissions in an initial wireless network access process, performed before the device begins to negotiate the wireless network connection with a base station (BS). If the M2M data is successfully transmitted to the BS in the initial communication(s), then further connection does not need to occur, saving power and transmissions needed to negotiate and establish the wireless network connection. Configurations for a system, base station, and user equipment (user equipment including various M2M communication capable devices) are also described herein, including configurations for implementing the data transmission techniques.

8 Claims, 6 Drawing Sheets

(51) Int. Cl.
| | |
|---|---|
| H04W 28/04 | (2009.01) |
| H04W 72/04 | (2009.01) |
| H04Q 11/04 | (2006.01) |
| H04L 12/70 | (2013.01) |
| H04L 12/801 | (2013.01) |
| H04L 12/701 | (2013.01) |
| H01L 29/06 | (2006.01) |
| H04W 28/02 | (2009.01) |
| H04W 4/00 | (2009.01) |
| H04W 68/02 | (2009.01) |
| H04W 56/00 | (2009.01) |
| H04W 48/16 | (2009.01) |
| H04W 4/08 | (2009.01) |
| H04W 74/04 | (2009.01) |

(52) U.S. Cl.
CPC .......... *H04W56/0045* (2013.01); *H04W 68/02* (2013.01); *H04W 4/08* (2013.01); *H04W 74/04* (2013.01); *Y02B 60/50* (2013.01)

(56) References Cited

OTHER PUBLICATIONS

"International Application Serial No. PCT/US2011/066640, Search Report mailed Aug. 29, 2012", 6 pgs.

"International Application Serial No. PCT/US2011/066640, Written Opinion mailed Aug. 29, 2012", 4 pgs.

"M2M Short Message Services in 16m", IEEE 802.16 Broadband Wireless Access Working Group, (Jul. 10, 2011), 5 pgs.

"Small Data Transmission from idle mode M2M device in WirelessMan OFDMA System", IEEE 802.16 Broadband Wireless Access Working Group, (Jul. 20, 2011), 4 pgs.

Chen, Bin, et al., "Quick Capability Negotiation Procedure to Improve M2M Support in 16p", IEEE 802.16 Broadband Wireless Access Working Group, IEEE C802.16p-11/0025, See all documents, (Mar. 6, 2011), 4 pgs.

Fan, Guanghui, et al., "Proposal for Access Distribution of Network Reentry M2M Device", IEEE 802.16 Broadband Wireless Access Working Group, IEEE C802.16p-11/0022, (Mar. 6, 2011), 3 pgs.

Lee, Jin, et al., "Small Data Transmission for Fixed M2M devices in Idle Mode", IEEE 802.16 Broadband Wireless Access Working Group, IEEE C802.16p-11/0031, See Section 'Proposal', 'Text Proposal' and firgure 1, (Mar. 6, 2011), 4 pgs.

Park, Giwon, et al., "Proposed Text for Network Reentry Procedure of Fixed M2M Device", IEEE 802.16 Broadband Wireless Access Working Group, IEEE C802.16/0018, See Sections 3-4 and figure 1, (Mar. 6, 2011), 7 pgs.

"European Application Serial No. 11860450.3, Extended European Search Report mailed Jul. 16, 2014", 5 pgs.

"European Application Serial No. 11860450.3, Office Action mailed Oct. 16, 2013", 2 pgs.

"European Application Serial No. 11860450.3, Response filed Apr. 1, 2014 to Office Action mailed Oct. 16, 2013", 13 pgs.

TELECOM, "Access Procedure Enhancements for MTC Applications", R2-103968, XP050451319, (Jun. 22, 2010).

"International Application Serial No. PCT/US2011/066640, International Preliminary Report on Patentability mailed Sep. 19, 2013", 6 pgs.

* cited by examiner

REDUCING POWER CONSUMPTION FOR M2M COMMUNICATIONS IN WIRELESS NETWORKS

PRIORITY CLAIM

This application is a U.S. National Stage Filing under 35 U.S.C. 371 from International Patent Application Serial No. PCT/US2011/066640, filed Dec. 21, 2011, published on Sep. 13, 2012 as WO 2012/121782 A2, which claims the benefit of priority to U.S. Provisional Patent Application Ser. No. 61/450,716, filed Mar. 9, 2011, both of which are incorporated herein by reference their entirety.

TECHNICAL FIELD

Embodiments pertain to wireless communications. Some embodiments relate to the use of wireless communication standards for wide and local area networks including WiMAX (e.g., a standard from the IEEE 802.16 standards family) and 3GPP Long Term Evolution (LTE)/LTE-Advanced (LTE-A).

BACKGROUND

Machine to Machine (M2M) communications may provide an information exchange between a subscriber station and a server in a core network (e.g., through a base station (BS)) or between subscriber stations, and may be carried out without any human interaction. An example of one architecture configuration supporting M2M techniques includes IEEE standard 802.16m-2011 (known as "Mobile WiMAX Release 2", "WiMAX II", or "WirelessMAN-Advanced").

Systems that include a large number of devices and mechanisms may provide requirements for low power consumption by the M2M communicating devices. However, if the M2M communicating devices forward data traffic to a BS in the dedicated channels (e.g., via a Physical Downlink Shared Channel (PDSCH) in LTE/LTE-A, or via data traffic channels in IEEE standard 802.16m-2011), then complicated power-consuming processes will be used to perform data transmissions, even for small bursts of data. Thus, there are general needs for improved methods of optimizing wireless communications for M2M communicating devices and network configurations.

DETAILED DESCRIPTION

Figure 1:
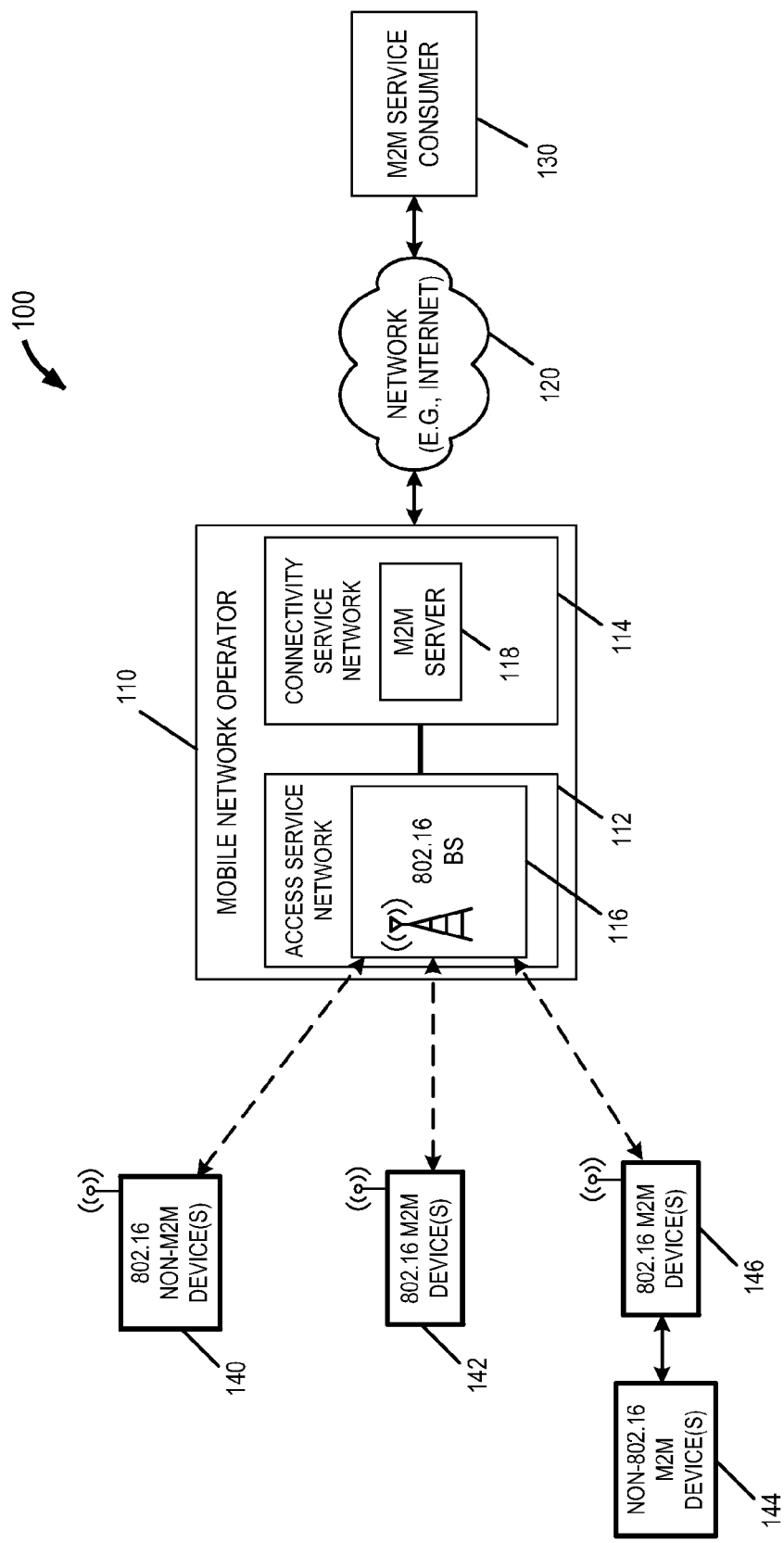
FIG. 1 illustrates an example M2M network architecture used in accordance with embodiments described herein.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present disclosure provides methods and configurations used for optimizing power consumption of M2M communicating devices (generally referred to herein as "M2M devices") in connection with communications in a wireless communication network. In various embodiments, this is performed through methods of optimizing existing data payload transmission mechanisms to result in shorter data transmissions, and thus reduced power consumption, for M2M devices during data exchanges.

Existing M2M devices and systems employ various strategies in an attempt to save power (for example, by extending the sleep duration for M2M devices). However, such techniques fail to save power during the data transfers themselves. The presently described techniques include a series of power-saving data transmission techniques designed to communicate with M2M devices in an idle state, establishing data transfers between M2M devices and wireless networks in a quick and efficient manner.

Several of the embodiments described herein provide specific techniques to optimize M2M device communications with the use of small burst transmissions in a simplified data payload transmission mechanism. This transmission mechanism may include one or more small data transmissions during initial wireless network ranging communications that occur between the M2M device and the wireless network station that the M2M device is attempting to connect to. The transmission mechanism may also include handling transfers for data transmissions having a size that exceeds the simplified data payload.

The simplified exchange between an M2M device and a base station may be used to facilitate a variety of small data transfers between M2M devices and a consuming service (generally referred to herein as a "M2M service"). Within typical M2M application usage models, for example, M2M communications transferred using IEEE standard 802.16p, the packet size of a M2M service communication is less than 128 bytes. Further, a typical characteristic of an M2M service includes the exchange of data transmissions that are time tolerant from devices with low mobility. Therefore, such types of M2M data payloads are suitable for transfer in a small burst transmission.

In one embodiment, power saving techniques for M2M device communications are performed by bundling M2M service data packets with an access message, or other request message occurring during the initial wireless network negotiation stage. If the M2M service data packages are successfully transferred to the BS during the initial negotiation stage, then the data connection may be terminated, saving any time spent further negotiating and establishing the wireless network connection between the BS and the M2M device. If the M2M service data packets are unable to be bundled with the access message, or otherwise transferred to the BS during the initial network negotiation stage, then the data transfer will proceed with existing network communication mechanisms.

For example, in a wireless network employing a standard from the IEEE 802.16 standards family, a M2M device in idle mode may be configured to exchange a small data burst of M2M device data within a range request or range response message. Thus, to perform a data upload from the M2M device, the data burst may be included in the range request (RNG-REQ) message already in use during initial ranging;

and to perform a data download from the M2M device, the data burst may be included in the range response (RNG-RSP) message already in use during initial ranging.

FIG. 1 provides an illustration of an example M2M network architecture 100 used in accordance with embodiments described herein. As illustrated, FIG. 1 shows a mobile network operator 110 providing an access service network 112 and a connectivity service network 114. Within the access service network 112, an 802.16 BS 116 is provided for wireless transmissions with a plurality of communicating devices. Within the connectivity service network 114, a M2M server 118 is hosted to provide services to a plurality of M2M devices. The mobile network operator 110 is further connected over a network 120 (such as the Internet or another wide area network (WAN)) to a M2M service consumer 130.

The 802.16 BS 116 specifically provides wireless communication to a plurality of mobile station (MS) devices, including one or more non-M2M devices 140, one or more 802.16 M2M devices 142, and one or more non-802.16 M2M devices 144 connecting through one or more M2M devices 146.

Figure 2:
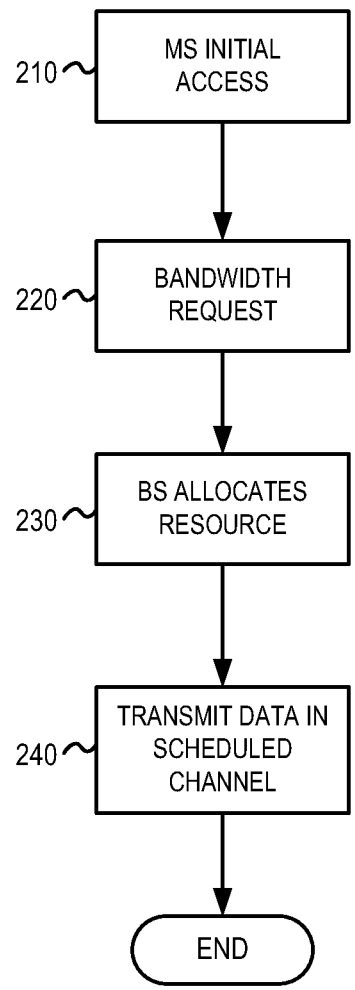
FIG. 2 provides a flowchart of a data transmission process used in accordance with embodiments described herein.

FIG. 2 provides a flowchart illustrating an overview of a data transmission process 200 used in a wireless network having a MS (such as a M2M device) and a BS in accordance with embodiments described herein. This data transmission process may be used in connection with uploads or downloads between the MS and the BS, although for simplicity, uploads are referenced.

As illustrated, the data transmission process first includes MS initial access in operation 210, such as is performed with initial ranging or the exchange of random access messages, used in a wireless network to determine timing of transmissions and proper alignment with a base station. The access procedure will vary depending on the wireless network type and various communication standards and protocols in use. Generally during the initial access procedure, one or more messages will be exchanged between the MS and the BS to determine the parameters for further communication.

Next, a bandwidth request is issued in operation 220, for example from the MS to the BS, to request a timing, channel, and resources to conduct a particular data transmission over the wireless network. In response, the BS will allocate resources in operation 230 to facilitate the transmission with the MS, such as allocating a particular time or channel to the MS for communications. Finally, in operation 240, data will be transmitted in the scheduled channel. For example, in upload scenarios, the MS will transmit data in the scheduled channel to the BS; and likewise, in a download scenario, the BS will transmit data in the scheduled channel to the MS.

Thus, the normal process for establishing communications with a M2M device MS in idle mode includes network re-entry, bandwidth request/allocation, and finally data delivery/transmission with M2M device. This communication process occurs regardless of the size of the data being transmitted from or communicated to the M2M device. It is apparent then that efficiency for delivery of small messages is very low with existing network configurations. In particular, if the data packet size exchanged with the M2M service is very small, the over control signaling and process involved will degrade the efficiency of the M2M device and wireless network.

Figure 3:
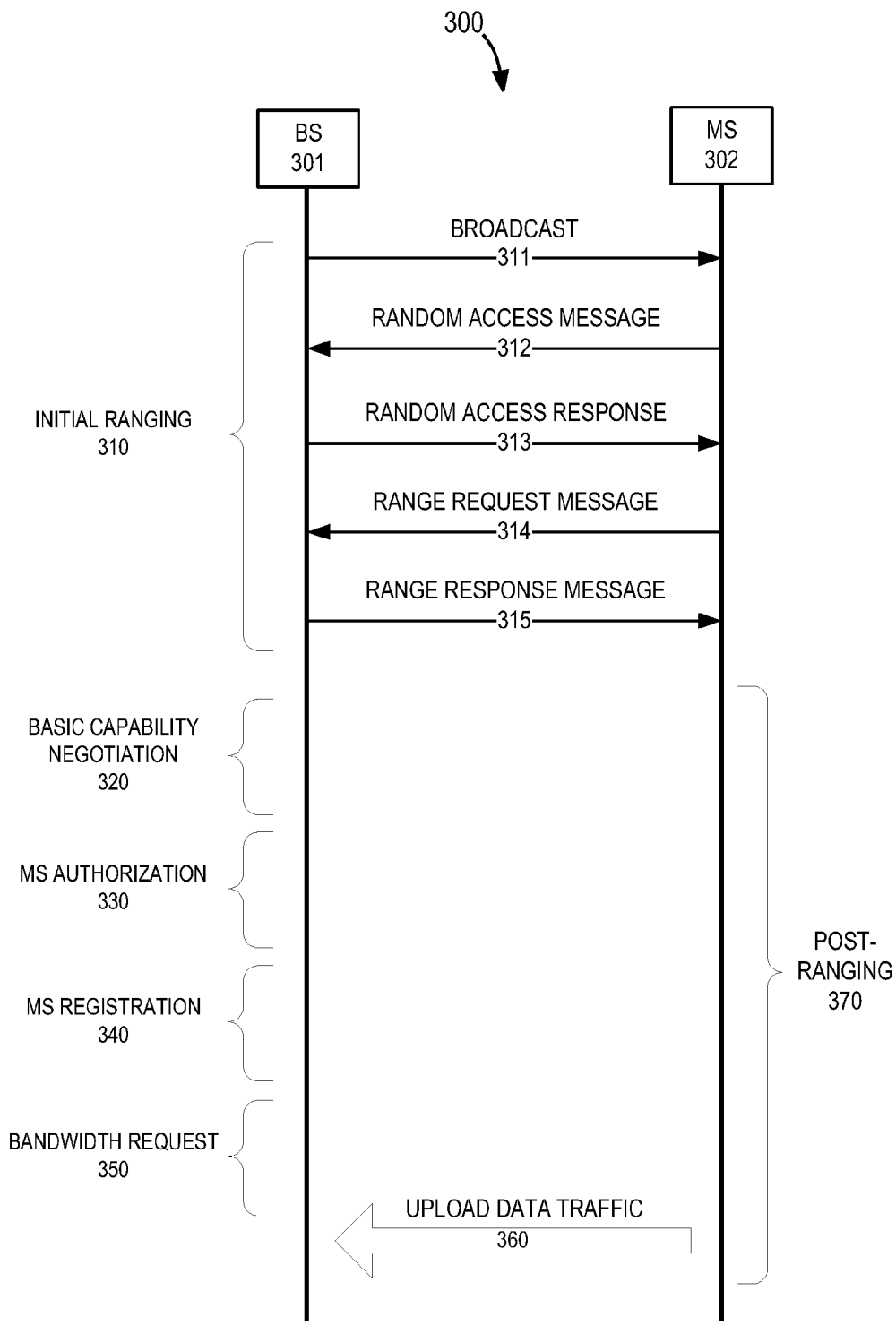
FIG. 3 illustrates a data transmission sequence occurring between a base station and a mobile station in a WiMAX network according to an example embodiment.

FIG. 3 provides an illustration of a data transmission sequence 300 occurring between a base station BS 301 and a mobile station MS 302 in a WiMAX network operating under the IEEE 802.16m-2011 standard, according to an example embodiment. In particular, this sequence demonstrates how M2M data packets may be bundled with initial ranging network access messages before establishing a connection with the base station, and thus performing the M2M data transfer exclusively during the initial ranging period (operation 210 in FIG. 2).

For example, during the initial ranging period 310, a series of messages are exchanged between BS 301 and MS 302. The BS will broadcast its connectivity information to all devices in range of the wireless network, including broadcast message 311, to MS 302.

After the MS 302 obtains broadcast information for the network (e.g., 802.16m-2011 initial ranging parameters), the MS 301 will select a random access slot and code to initiate a network access procedure with the BS 301. The MS 302 will use the selected slot and code to transmit a random access message 312 to the BS 301. If the BS 301 receives the random access message successfully, it will respond with a random access response message 313 to MS 302.

Next, the MS 302 is configured to bundle data, such as M2M service data packets, to an access message transmitted to the BS 301. For example, this may include transmission in a range request message (e.g., an AAI-RNG-REQ message provided by the use of IEEE standard 802.16m-2011), illustrated with the transmission of range request message 314. The data may be included in various other types of access messages transmitted with the BS 301, for example, in an access message sent via a common packet channel (CPCH) in a Universal Mobile Telecommunications System (UMTS) Wideband Code Division Multiple Access (WCDMA) network configuration; or in a radio resource control (RRC) connection request message (RRC_Connect request) in a 3GPP LTE/LTE-A network configuration (for example, Physical Uplink Shared Channel (PUSCH) which is used for an RRC_Connect request when included in a random access response MAC layer header).

Finally, the BS 301 will provide a response message, such as range response message 315, indicating the results of receiving the access message and the bundled M2M data. If no collision occurs in the wireless network and the data is successfully received, BS 301 will decode the data transmission and further communicate the data transmission (and the M2M data included therein) as appropriate. Thus, at the conclusion of the initial ranging period 310, the data has been successfully transmitted between the MS 302 and the BS 301.

Because the bundled data has been successfully communicated with the BS, there is no reason to further negotiate the wireless network connection. Thus, wireless network operations such as capability negotiation (occurring in time period 320), mobile station authorization (occurring in time period 330), mobile station registration (occurring in time period 340), bandwidth request (occurring in time period 350), and the direct upload of data traffic 360 do not need to occur. Moreover, all activities occurring in the post-ranging period 370 may not be necessary due to the bundling and communication of the M2M data during messages in the initial ranging period 310.

Thus, it is apparent that a M2M device will be able to terminate the data transmission of a M2M service at an earlier time, saving time and power when needing to perform a small M2M data transmission. Being that numerous bundled transmissions may occur in the same amount of time needed for one fully-negotiated data transmission, this may significantly improve the power consumption and network performance of devices in M2M communication systems.

Figure 4:
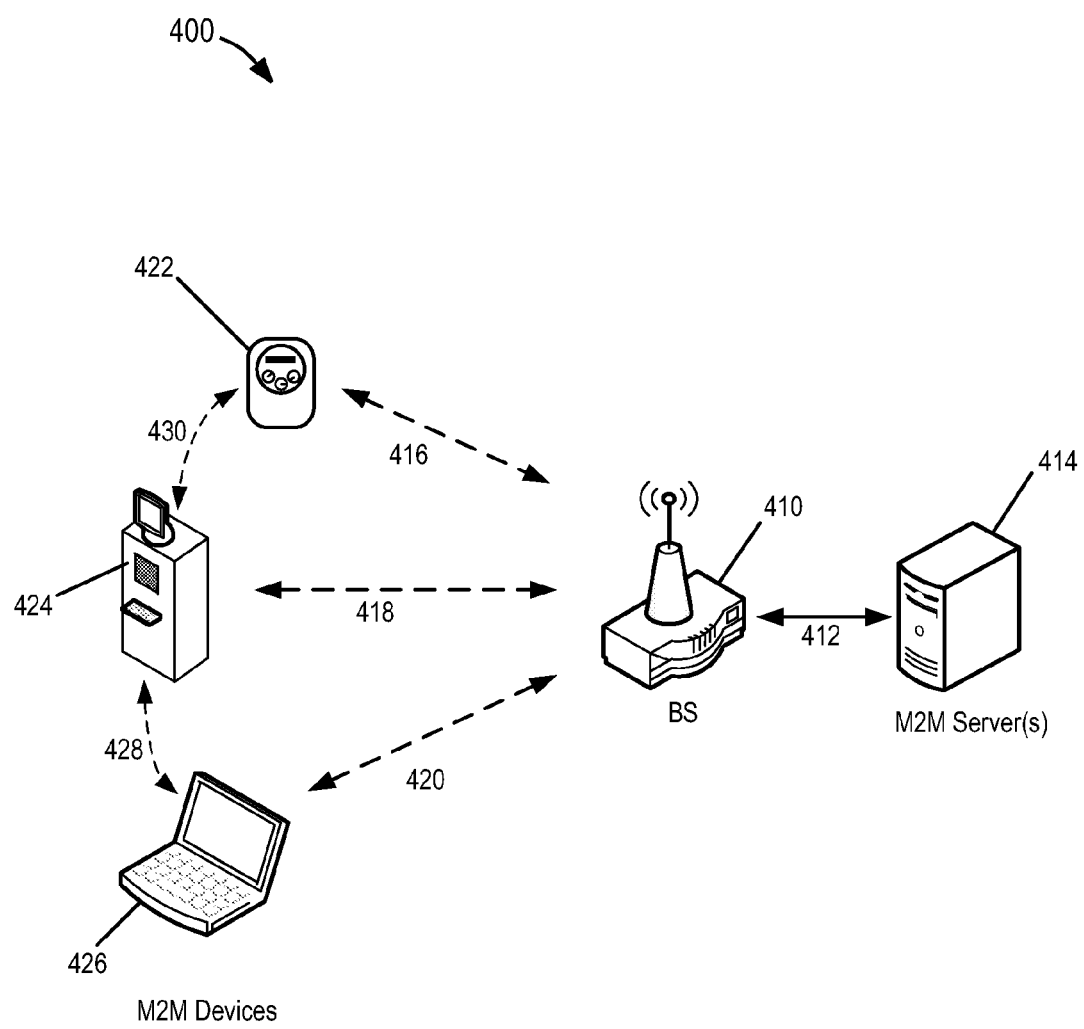
FIG. 4 illustrates various transmissions of M2M data in a networked system according to an example embodiment.

FIG. 4 provides an illustration of an example system 400 arranged for providing M2M data transmissions with a series of communicating devices, in accordance with the embodiments described herein. As illustrated, a BS 410 is in operable communication with one or more M2M servers 414. The BS

410 may be connected to one or a plurality of M2M services operating through M2M servers 414 through a network connection 412. The M2M servers 414 may be operating in a same network as the BS 410, such as a same carrier access network, or connected over a WAN or the Internet to the M2M servers 414.

Various M2M devices and device communication attempts are illustrated in FIG. 4, from M2M devices or subsystems embedded in meter 422, terminal 424, and computing system 426. Communication between the M2M devices or subsystems may occur between the M2M devices or subsystems themselves, illustrated in communication transmissions 428 and 430, via wired or wireless transmissions (e.g., within the wireless network established through BS 410); and between the M2M devices or subsystems and the M2M server(s) 414 as facilitated through BS 410, illustrated in communication transmissions 416, 418, 420.

Figure 5:
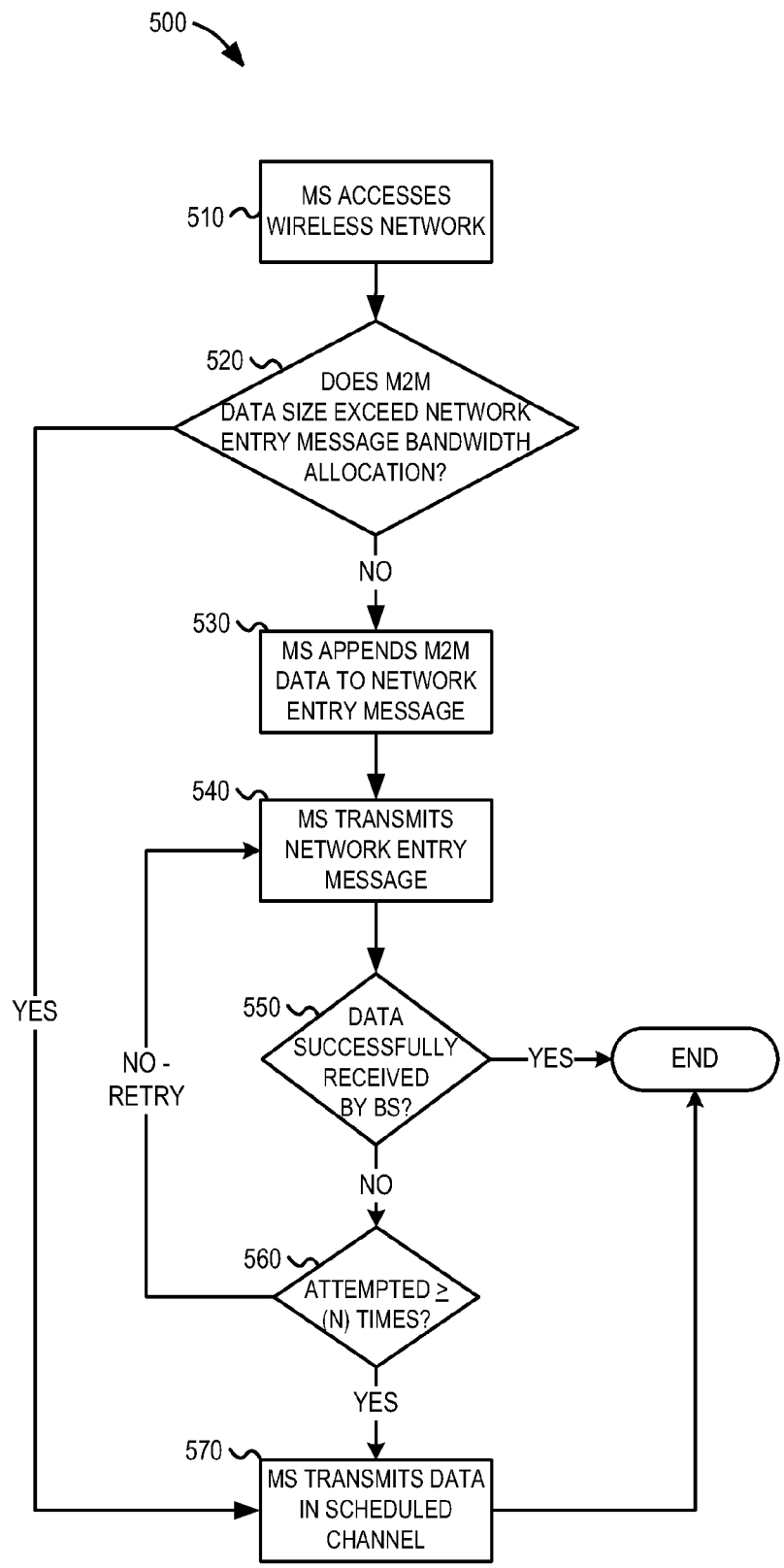
FIG. 5 provides a flowchart of a method for transmitting M2M data in a wireless communication by appending short burst data according to an example embodiment.

FIG. 5 provides a flowchart illustrating an example method 500 for transmitting M2M data in a wireless network communication by appending the data of a M2M device to a network entry message (such as a range request message as previously described) according to one example embodiment. As depicted, in operation 510, the M2M device (MS) accesses the network, and may obtain network access information such as base station broadcast information for further communication in the network. In decision 520, verification or other processing may be performed upon the M2M data prior to its communication in the wireless network, such as determining whether the M2M data size exceeds the network entry message bandwidth allocation. If the data size exceeds the network entry message, then the MS will continue to negotiate and establish the wireless network connection and transmit the data in the scheduled channel as in operation 570.

If the data size is appropriate for appending to the network entry message, then the M2M data is appended to the network entry message in operation 530. The MS then attempts to transmit this network entry message to the BS in 540. If the network entry message and the accompanying M2M data are successfully received by the BS in decision 550, then the data transmission is complete and no further data transmission operations need to occur.

If the network entry message and the accompanying M2M data are not successfully received by the BS in decision 550, and the message has not been attempted at least (N) times, then the MS transmits the network entry message again in operation 540. The re-transmission in operation 540 and verification in decision 560 is attempted up to (N) times (a predetermined value). If the re-transmission of the network entry message does not succeed within (N) attempts, then the MS transmits the data in the scheduled channel after negotiating and fully establishing the wireless network connection as in operation 570.

In an alternate embodiment, if the M2M data size exceeds the bandwidth allocation for inclusion within a single network entry message as determined in decision 520, or is otherwise unsuitable for appending to a network entry message, then various techniques are used to transmit the data during the initial ranging phase without requiring a full negotiation and establishment of a wireless network connection. For example, in an IEEE 802.16 setting, multiple range request messages may be used to transmit M2M data that cannot be contained in a single range request message. Likewise, a network entry message may be used to indicate that a specific type of M2M data transmission is desired, and the BS may provide a specific bandwidth allocation or messaging protocol space to receive this data transmission.

Variations and combinations of the previous examples may be used in conjunction with the presently described embodiments. For example, data may be provided in a variety of configurations based on the transmitting device, and may be provided from devices other than those characterized as M2M devices (including non-M2M devices configured to communicate through a M2M device). Contents of the data transmissions may be encrypted by using end-to-end application layer encryption, or as suggested above, split into multiple messages and transferred during multiple transmissions. Processing logic may be provided in any of the BS, the M2M device, or the M2M server to facilitate use of such data or transmissions.

The wireless networks used to facilitate communications between the devices may be provided using any number of protocols or techniques, including, in some embodiments, an orthogonal frequency division multiple access (OFDMA) digital modulation scheme which allows data transmissions from multiple users. Further, devices having a plurality of antennas may be configured to perform communications with a wireless network using multiple-input multiple-output (MIMO) beamforming techniques.

While use of 3GPP LTE/LTE-A, WiMAX, and UMTS standards are described herein as example mobile network protocols, the presently described framework and techniques are applicable to other mobile broadband standards and network configurations. Further, the term "M2M" as used herein is not necessarily limited to standalone devices which directly create and transmit self-contained data, but may include a variety of simple or complex systems configured to communicate data from a variety of sources. Other system, device, and network configurations may therefore be included within the scope of the presently described embodiments.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the base station or the user equipment (e.g., a M2M communicating device) may include one or more processors and may be configured with instructions stored on a computer-readable storage device.

Figure 6:
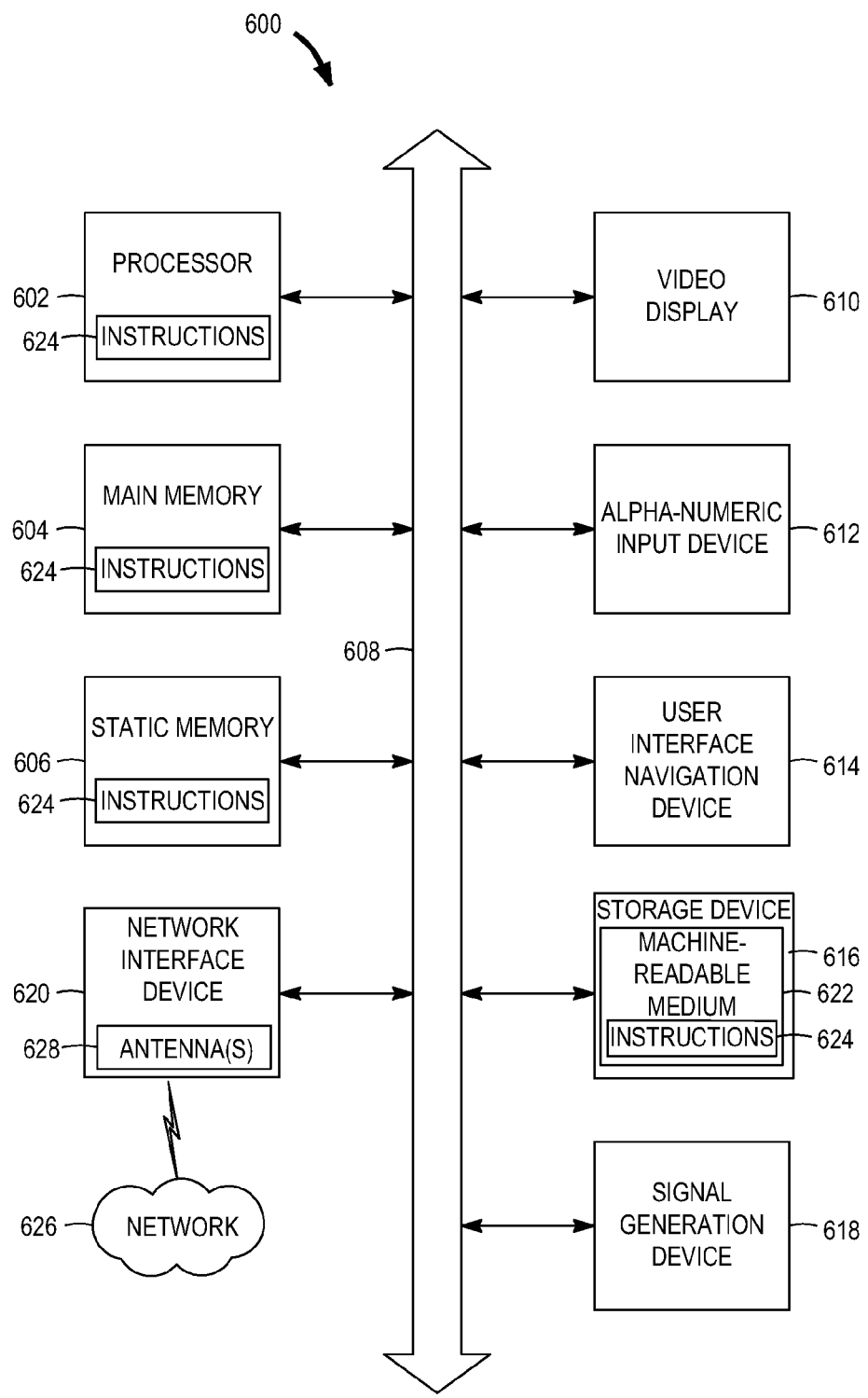
FIG. 6 illustrates a block diagram of an example machine upon which one or more embodiments can be implemented.

FIG. 6 is a block diagram illustrating an example machine upon which any one or more of the methodologies herein discussed can be run. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 604 and a static memory 606, which communicate with each other via a bus 608. The computer system 600 can further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are a touch screen display. The computer system 600 can additionally include a storage device 616 (e.g., a drive unit), a signal generation device 618 (e.g., a speaker), a network interface device 620 (which may include or operably communicate with one or more antennas 628, transceivers, or other wireless communications hardware), and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 can also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of well-known transfer protocols (e.g., HTTP). Examples of communication networks include a local area network (LAN), a WAN, the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes a base station, comprising: a wireless network transceiver arranged to provide a wireless network for communication with a M2M communicating device; and physical-layer circuitry arranged to process communications received from the M2M communicating device, the circuitry comprising data processing circuitry arranged for processing one or more network access messages received in a data transmission from a respective M2M communicating device during an initial network entry procedure, and the processing including: extracting M2M data appended to the network access messages; and providing a response to the network access messages.

In Example 2, the subject matter of Example 1 can optionally include conducting communications in the wireless network according to a standard from the IEEE 802.16 standards family, wherein the network access messages include a range request message provided during initial ranging of the respective M2M communicating device with the base station.

In Example 3, the subject matter of one or any combination of Examples 1-2 can optionally include conducting communications in the wireless network according to a 3GPP Long Term Evolution (LTE) or LTE-Advanced (LTE-A) standard, wherein the network access messages include a radio resource control (RRC) connection request message.

In Example 4, the subject matter of one or any combination of Examples 1-3 can optionally include conducting communications in the wireless network according to a 3GPP Universal Mobile Telecommunications System (UMTS) standard, wherein the network access messages include an access message provided in uplink common packet channel (CPCH) transmissions.

Example 5 can include, or can optionally be combined with the subject matter of one or any combination of Examples 1-4 to include, a machine-to-machine (M2M) communicating device, comprising: a data transmission module arranged to transmit one or more wireless network data transmissions, the data transmissions including a network access message provided during an initial network entry procedure between a base station and the M2M communicating device; and a M2M data module arranged to append short-burst data to the network access message.

In Example 6, the subject matter of Example 5 can optionally include conducting wireless communications in the wireless network according to a standard from the IEEE 802.16 standards family, wherein the network access message comprises a range request message provided during initial ranging of the M2M communicating device with the base station.

In Example 7, the subject matter of one or any combination of Examples 5-6 can optionally include conducting wireless communications in the wireless network according to a 3GPP Long Term Evolution (LTE) or LTE-Advanced (LTE-A) standard, wherein the network access message comprises a radio resource control (RRC) connection request message.

In Example 8, the subject matter of one or any combination of Examples 5-7 can optionally include conducting wireless communications in the wireless network according to a 3GPP Universal Mobile Telecommunications System (UMTS) standard, wherein the network access message comprises an access message provided in an uplink common packet channel (CPCH) transmission.

In Example 9, the subject matter of one or any combination of Examples 5-8 can optionally include the M2M communicating device arranged to wirelessly communicate with the base station using multiple-input multiple-output (MIMO) beamforming with a plurality of antennas.

In Example 10, the subject matter of one or any combination of Examples 5-9 can optionally include the data transmissions respectively including a plurality of network access messages.

In Example 11, the subject matter of one or any combination of Examples 5-10 can optionally include the data transmissions respectively including one or more additional messages provided during the initial network entry procedure, wherein the M2M data is provided among the network access message and the one or more additional messages.

In Example 12, the subject matter of one or any combination of Examples 5-11 can optionally include performing a data transmission of the network access message for a predetermined number of times until the network access message is acknowledged as successfully received by the base station.

Example 13 can include, or can optionally be combined with the subject matter of one or any combination of Examples 1-12 to include, method performed by a machine-to-machine (M2M) communicating device during a wireless connection establishment, comprising: accessing a wireless network provided by a base station; appending short-burst data from the M2M communicating device to a network entry message for the wireless network; and transmitting the network entry message to the base station during an initial network entry procedure between the M2M communicating device and the base station.

In Example 14, the subject matter of Example 13 can optionally comprise transmitting the short-burst data during an established connection between the M2M communicating device and the base station responsive to the base station not successfully receiving the short-burst data from the network entry message.

In Example 15, the subject matter of one or any combination of Examples 13-14 can optionally include the initial network entry procedure occurring prior to wireless capability negotiation, wherein the wireless connection establishment between the M2M communicating device and the base station is terminated responsive to the base station successfully receiving the short-burst data from the network entry message.

In Example 16, the subject matter of one or any combination of Examples 13-15 can optionally include receiving a random access response message from the base station, wherein the network entry message is transmitted in response to the random access message.

Example 17 can include, or can optionally be combined with the subject matter of one or any combination of Examples 1-16 to include, a system, comprising: a base station providing a wireless network; and a machine-to-machine (M2M) communicating device operable to wirelessly communicate with the base station via the wireless network, wherein short-burst data from the M2M communicating device is included within a data transmission between the M2M communicating device and the base station, the data transmission provided during an initial network entry communication procedure between the base station and the M2M communicating device.

In Example 18, the subject matter of Example 17 can optionally comprise the base station being arranged to wirelessly communicate with the M2M communicating devices using multiple-input multiple-output (MIMO) beamforming with a plurality of antennas.

In Example 19, the subject matter of one or any combination of Examples 17-18 can optionally comprise the short-burst data being provided by the M2M communicating device for communication to an M2M service, and wherein the base station is arranged to communicate the short-burst data to the M2M service.

In Example 20, the subject matter of one or any combination of Examples 17-19 can optionally comprise the M2M communicating device being arranged to perform the data transmission for a predetermined number of times until the data transmission is acknowledged as successfully received by the base station.

In Example 21, the subject matter of one or any combination of Examples 17-20 can optionally comprise the M2M communicating device being arranged to further negotiate the wireless network connection and transmit the short-burst data in a scheduled channel responsive to the short-burst data being unsuccessfully transmitted to the base station in the initial network entry procedure.

Example 22 can include, or can optionally be combined with any portion or combination of any portions of any one or more of Examples 1-21 to include, subject matter that can include means for performing any one or more of the functions of Examples 1-21, or a machine-readable medium including instructions that, when performed by a machine, cause the machine to perform any one or more of the functions of Examples 1-21.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a machine-to-machine (M2M) communications device during a wireless connection establishment, the method comprising:
    accessing a wireless network provided by a base station, the accessing including receiving a random access response message from the base station;
    appending short-burst data from the M2M communications device to a network entry message for the wireless network; and
    transmitting, in response to receiving the random access message, the network entry message to the base station during an initial network entry procedure between the M2M communications device and the base station.

2. The method of claim 1, further comprising transmitting the short-burst data during an established connection between the M2M communications device and the base station responsive to the base station not successfully receiving the short-burst data from the network entry message.

3. The method of claim 1, wherein the initial network entry procedure occurs prior to wireless capability negotiation, and wherein the wireless connection establishment between the M2M communications device and the base station is terminated responsive to the base station successfully receiving the short-burst data from the network entry message.

4. A machine-to-machine (M2M) communications device, comprising:
    circuitry to:
    access a wireless network provided by a base station, wherein the access includes receipt of a random access response message from the base station;
    append short-burst data from the M2M communications device to a network entry message for the wireless network; and transmit, in response to receipt of the random access message, the network entry message to the base station during an initial network entry procedure between the M2M communications device and the base station.

5. The M2M communications device of claim 4, wherein the transmission of the short-burst data during an established connection between the M2M communications device and the base station is in response to an unsuccessful receipt by the base station of the short-burst data from the network entry message.

6. The M2M communications device of claim 4, wherein the initial network entry procedure is to occur prior to wireless capability negotiation, and wherein the wireless connection establishment between the M2M communications device and the base station is terminated responsive to successful receipt by the base station of the short-burst data from the network entry message.

7. A base station, comprising:
a wireless network transceiver arranged to provide a wireless network to communicate with a machine-to-machine (M2M) communications device; and
physical-layer circuitry arranged to process communications received from the M2M communications device, the circuitry arranged to process one or more network access messages received in a data transmission from a respective M2M communications device during an initial network entry procedure, by:
extraction of M2M data appended to the network access messages; and
provision of a response to the network access messages;
wherein communications in the wireless network are conducted according to a 3GPP Universal Mobile Telecommunications System (UMTS) standard, and wherein the network access messages include an access message provided in uplink common packet channel (CPCH) transmissions.

8. A method performed by a base station, the method comprising:
processing one or more network access messages received in a data transmission from an M2M communications device during an initial network entry procedure, the processing including:
extracting M2M data appended to the network access messages; and
providing a response to the network access messages;
wherein communications in the wireless network are conducted according to a 3GPP Universal Mobile Telecommunications System (UMTS) standard, and wherein the network access messages include an access message provided in uplink common packet channel (CPCH) transmissions.

\* \* \* \* \*